US012001592B2

(12) United States Patent
Rao et al.

(10) Patent No.: US 12,001,592 B2
(45) Date of Patent: Jun. 4, 2024

(54) PROTECTING AGAINST RESETS BY UNTRUSTED SOFTWARE DURING CRYPTOGRAPHIC OPERATIONS

(71) Applicant: NVIDIA Corporation, Santa Clara, CA (US)

(72) Inventors: Anuj Rao, Sunnyvale, CA (US); Adam Hendrickson, Morgan Hill, CA (US); Vaishali Kulkarni, Sunnyvale, CA (US); Gobikrishna Dhanuskodi, Santa Clara, CA (US); Naveen Cherukuri, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 221 days.

(21) Appl. No.: 17/652,088

(22) Filed: Feb. 22, 2022

(65) Prior Publication Data

US 2023/0267235 A1 Aug. 24, 2023

(51) Int. Cl.
| | | |
|---|---|---|
| *G06F 21/72* | (2013.01) | |
| *G06F 21/60* | (2013.01) | |
| *G06F 21/71* | (2013.01) | |
| *G06F 21/74* | (2013.01) | |
| *G06F 21/79* | (2013.01) | |

(52) U.S. Cl.
CPC ............ *G06F 21/72* (2013.01); *G06F 21/602* (2013.01); *G06F 21/71* (2013.01); *G06F 21/74* (2013.01); *G06F 21/79* (2013.01)

(58) Field of Classification Search
CPC .......... G06F 21/71; G06F 21/72; G06F 21/74; G06F 21/79; G06F 21/602

USPC .......................................................... 713/192
See application file for complete search history.

(56) References Cited

U.S. PATENT DOCUMENTS

| | | | | |
|---|---|---|---|---|
| 6,385,727 | B1* | 5/2002 | Cassagnol | G06F 21/57 713/168 |
| 6,704,871 | B1* | 3/2004 | Kaplan | G06F 21/74 713/192 |
| 6,708,273 | B1* | 3/2004 | Ober | G06F 21/79 713/192 |
| 11,775,659 | B2* | 10/2023 | Kida | G06F 21/602 713/192 |
| 2002/0129245 | A1* | 9/2002 | Cassagnol | G06F 21/57 713/168 |
| 2012/0124393 | A1* | 5/2012 | Sethumadhavan | H04L 9/008 726/36 |
| 2020/0167487 | A1* | 5/2020 | Kida | G06F 21/72 |

(Continued)

OTHER PUBLICATIONS

NIST Special Publication 800-38D, published Nov. 2007, https://nvlpubs.nist.gov/nistpubs/Legacy/SP/ histspecialpublication800-38d.pdf.

*Primary Examiner* — Samson B Lemma
(74) *Attorney, Agent, or Firm* — LOWENSTEIN SANDLER LLP

(57) ABSTRACT

Apparatuses, systems, and techniques for handling faults by a direct memory access (DMA) engine. When a DMA engine detects an error associated with an encryption or decryption operation, the DMA engine reports the error to a CPU, which may be executing an untrusted software directing a DMA operation, and the secure processor. The DMA engine waits for clearance from the secure processor before responding to further directions from the potentially untrusted software.

20 Claims, 8 Drawing Sheets

(56) References Cited

U.S. PATENT DOCUMENTS

2021/0064375 A1\* 3/2021 Gerzon ............... G06F 12/0891
2022/0100584 A1\* 3/2022 Lal ........................ G06F 9/3814

\* cited by examiner

PROTECTING AGAINST RESETS BY UNTRUSTED SOFTWARE DURING CRYPTOGRAPHIC OPERATIONS

TECHNICAL FIELD

At least one embodiment pertains to processing resources used to perform and facilitate confidential data transfers. For example, at least one embodiment pertains to hardware circuits for preventing resets by untrusted software during cryptographic operations.

BACKGROUND

Accelerator circuits include direct memory transfer (DMA) circuits to access system memory independently of a central processing unit (CPU). The DMA circuits can also be used for memory-to-memory copying or moving of data within memory or between memories. When data needs to be protected, the DMA circuits can implement cryptographic circuits to encrypt and decrypt data being copied from and to secure memory. Critical security faults in user space, like authentication errors, can occur and normally, these faults are reported to system software, like a graphics processing unit (GPU) resource manager (RM). During cryptographic operations, system software is untrusted so critical security faults in user space reported to the RM cannot be relied upon since system software can mask critical security fault reporting, hiding authentication errors from the user. Moreover, even if the critical security faults are reported to secure software, the reset of the DMA circuit is handled by the untrusted system software. If a reset is triggered before the secure software handles the critical security faults, the untrusted system software could potentially mask the association of the error with the appropriate context.

DETAILED DESCRIPTION

Figure 1:
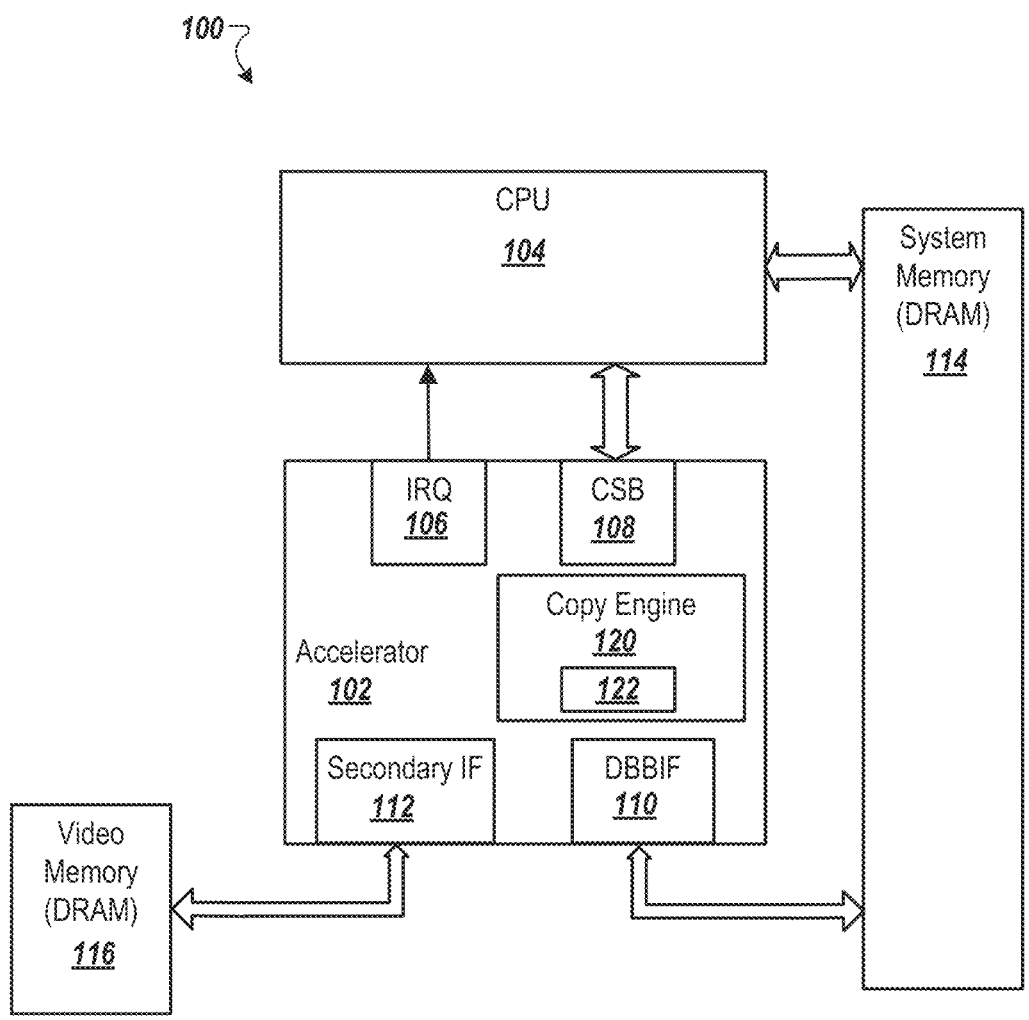
FIG. 1 is a block diagram of a computing system with an accelerator circuit including a copy engine that prevents resets from untrusted software during cryptographic operations by the accelerator circuit, in accordance with at least some embodiments.

As described above, DMA circuits can be used for memory-to-memory copying or moving of data within memory and can include cryptographic hardware to protect data. During cryptographic operations, system software is untrusted and could potentially hide authentication errors from the user. Moreover, the untrusted system software can reset the DMA circuit before critical security faults are handled, potentially exposing data. For example, partially authenticated text can be exposed if not removed by secure software after authentication errors. For another example, initialization vectors (IVs) can be exposed and reused if not reconfigured by secure software after IV counter overflow errors. If the critical security faults are not handled before the reset, there is a window in which data used by the cryptographic hardware is potentially exposed to an attacker.

Aspects and embodiments of the present disclosure address these and other challenges by providing a secure reporting path for reporting critical security faults and reset-handling logic that holds a reset signal from untrusted software until the critical security faults are cleared. In at least one embodiment, an accelerator circuit includes a DMA engine (also referred to as a copy engine (CE)) coupled to a secure processor via a private interface and a central processing unit (CPU) via an encrypted interface. The DMA engine detects an error associated with an encryption or decryption operation by a cryptographic hardware engine. The DMA engine sets one or more interrupt status bits in a first register accessible by the secure processor. The DMA engine reports one or more interrupts associated with the error to the CPU and the secure processor. The secure processor performs one or more operations to clear the one or more interrupt status bits. The DMA engine can receive a reset signal from the untrusted software. The DMA engine holds the reset signal (to prevent the reset of the DMA engine) until the one or more interrupt status bits are cleared by the secure processor. Responsive to the one or more interrupt status bits being cleared by the secure processor, the reset of the DMA engine is performed.

The accelerator circuit can be a graphics processing unit (GPU), a deep learning accelerator (DLA) circuit, an intelligence processing unit (IPU), a neural processing unit (NPU), a tensor processing unit (TPU), a neural network processor (NNP), a data processing unit (DPU), a vision processing unit (VPU), an application-specific integrated circuit (ASIC), or a field-programmable gate array (FPGA). Accelerator circuits can address the computational demands of neural network inference stage by providing building blocks that accelerate core deep learning operations. A deep learning accelerator, for example, can be used to accelerate different neural networks, such as convolutional neural networks (CNNs), recurrent neural networks (RNN), fully connected neural networks, and so on.

An accelerator circuit can be scheduled by a host central processing unit (CPU) coupled to the accelerator circuit. Alternatively, the accelerator circuit can be scheduled locally by firmware to ensure minimum latency. The accelerator circuit can be used for different types of layers in these neural networks, such as fixed-function engines for convolutions, activation functions, pooling, batch normalization, or the like. It should be noted that a neural network from an algorithmic perspective can be specified with one set of layers (referred to herein as "original layers") such as bias and batch normalization. Those original layers can be compiled or transformed into another set of layers (referred to herein as "hardware layers") where each hardware layer is used as a basic element for scheduling to be executed on an accelerator circuit. The mapping between original layers and hardware layers can be m:n, where m is the number of original layers and n is the number of hardware layers. For example, in a neural network, original layers bias, batch normalization and local response normalization (LRN), such as a rectified linear unit (ReLU), can be compiled into one hardware layer. In that case, the m:n is 3:1. Each hardware layer can be represented by a basic hardware instruction for the accelerator circuit to perform an operation, and each layer can communicate with another layer by a memory interface. For example, a first layer can be performed by a first-fixed function engine in a DLA circuit that receives an input tensor, performs an operation on the input tensor to generate an output tensor, and stores the output tensor in system memory, such as dynamic random access memory (DRAM) coupled to the accelerator. A second fixed-function engine can perform a second layer that receives the output tensor from the first layer from memory as a second input tensor, performs an operation on the second input tensor to generate a second output tensor, and stores the second output tensor in DRAM. Each communication introduces a tensor read operation and a tensor write operation in the memory interface.

FIG. 1 is a block diagram of a computing system 100 with an accelerator circuit 102 including a copy engine 120 that prevents resets from untrusted software during cryptographic operations by the accelerator circuit 102, in accordance with at least some embodiments. The computing system 100 is considered a headless system in which unit-by-unit management of an accelerator circuit 102 happens on a main system processor, CPU 104. The accelerator circuit 102 includes an interrupt interface 106, a configuration space bus (CSB) interface 108, a primary data bus interface 110 (data backbone interface (DBBIF)), a secondary data bus interface 112, and a copy engine (CE) 120, as described in more detail below. The CPU 104 and the accelerator circuit 102 are coupled to system memory 114 (e.g., DRAM). The accelerator circuit 102 is coupled to the system memory 114 via the primary data bus interface 110. The accelerator circuit 102 can be coupled to a secondary memory 116, such as video memory (DRAM and/or SRAM), via the secondary data bus interface 112. The CSB interface 108 can be a control channel interface that implements a register file (e.g., configuration registers) and an interrupt interface. In at least one embodiment, the CSB interface 108 is a synchronous, low-bandwidth, low-power, 32-bit control bus designed to be used by the CPU 104 to access configuration registers in the accelerator circuit 102. The interrupt interface can be a 1-bit level-driven interrupt. The interrupt line can be asserted when a task has been completed or when an error occurs.

The accelerator circuit 102 can also include a memory interface block that uses one or more bus interfaces to interface with memory. In at least one embodiment, the memory interface block uses the primary data bus interface 110 connecting to the system memory 114. The system memory 114 can include DRAM. The primary data bus interface 110 can be shared with the CPU and input/output (I/O) peripherals. In at least one embodiment, the primary data bus interface 110 is a data backbone (DBB) interface that connects the accelerator circuit 102 and other memory subsystems. The DBB interface is a configurable data bus that can specify different address sizes, different data sizes, and issue different sizes of requests. In at least one embodiment, the DBB interface uses an interface protocol, such as AXI (Advanced Extensible Interface) or other similar protocols. In at least one embodiment, the memory interface block uses the secondary data bus interface 112 to connect to secondary memory 116 dedicated to the accelerator circuit 102. The secondary memory 116 can include DRAM. The secondary memory 116 can be video memory. The accelerator circuit 102 can also include a memory interface that connects to higher-bandwidth memory dedicated to the accelerator circuit 102. This memory can be on-chip SRAM to provide higher throughput and lower access latency.

For example, during inference, a typical flow begins with a management processor (either a microcontroller or a CPU), coupled to accelerator circuit 102, sending a hardware layer configuration and an activate command. If data dependencies do not preclude this, multiple hardware layers can be sent to different engines and activated simultaneously (e.g., if there is another layer whose inputs do not depend on the previous layer's output). In at least one embodiment, every engine can have a double buffer for its configuration registers that allows a second layer's configuration to begin processing when the active layer has completed. Once a hardware engine finishes its active task, the accelerator circuit 102 can interrupt the management processor to report the completion, and the management processor can begin the process again. This kind of command-execute-interrupt flow repeats until inference on the entire network is complete. In at least one embodiment, an interrupt interface can signal completion of a copy. In another embodiment, a semaphore release (write to a flag typically in system memory that CPU thread is polling) can be used to let software know that the workload has finished.

The computing system 100 of FIG. 1 represents a more cost-sensitive system than a computing system with a dedicated controller or coprocessor for unit-by-unit management of the accelerator circuit 102. The computing system 100 can be considered a small system model. The small system model can be used for cost-sensitive connected Internet of Things (IoT) class devices, artificial intelligence (AI), and automation-oriented systems with well-defined tasks for which cost, area, and power are the primary drivers. Savings in terms of cost, area, and power can be achieved through configurable resources of the accelerator circuit 102. Neural network models can be pre-compiled and their performance can be optimized, allowing larger models to be reduced in the load complexity. In turn, the reduction in load complexity enables a scaled-down DLA implementation where models consume less storage and take less time for system software to load and process. In at least one embodiment, the computing system 100 can execute one task at a time. Alternatively, the computing system 100 can execute multiple tasks at a time. For computing system 100, context switches by computing system 100 do not result in the CPU 104 being overly burdened by servicing a large number of interrupts from the accelerator circuit 102. This removes the need for an additional microcontroller, and the CPU 104 performs memory allocation and other subsystem management operations. As described herein, the accelerator circuit 102 includes a copy engine 120 that prevents resets from untrusted software during cryptographic operations by the accelerator circuit 102. In at least one embodiment, the copy engine 120 includes reset-handling logic 122. Reset-handling logic 122 can receive a reset signal from untrusted software and can hold the reset signal (to prevent reset of the copy engine 120) until all security faults are cleared. The reset-handling logic 122 can allow one or more operations to be performed to protect a context associated with encryption or decryption operations being performed by the accelerator circuit 102 before allowing the reset to occur. For example, before the reset is allowed by the reset-handling logic 122, partially authenticated text can be removed by secure software after authentication errors have occurred. For another example, before the reset is allowed by the reset-handling logic 122, IVs can be reconfigured after IV counter overflow errors have occurred. The reset-handling logic 122 allows the security faults to be handled before the reset, closing the window in which data used by the cryptographic hardware would otherwise be potentially exposed to an attacker. Additional details of the copy engine 120 are described below with respect to FIGS. 2-3.

Figure 2:
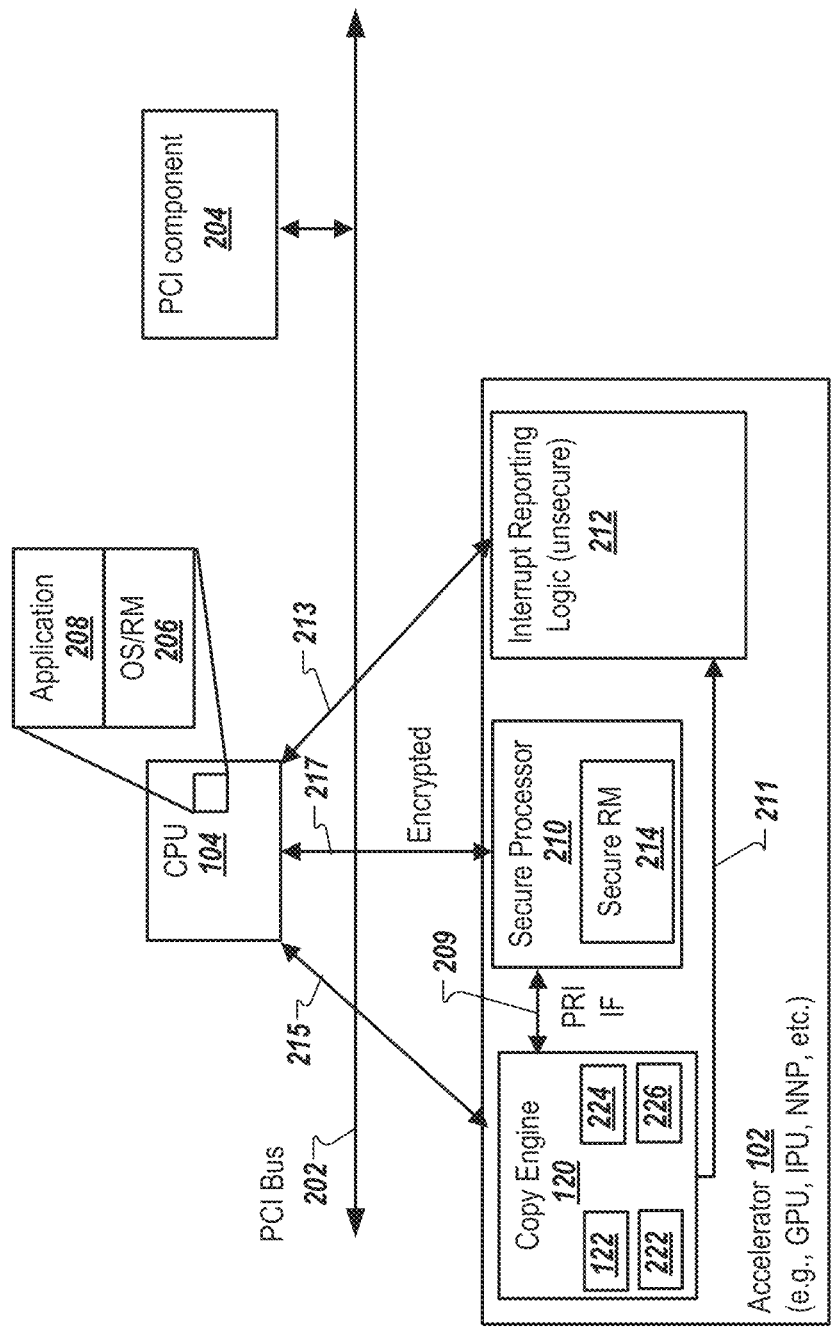
FIG. 2 is a block diagram of an accelerator circuit with a private interface between a copy engine and a secure processor, in accordance with at least some embodiments.

FIG. 2 is a block diagram of an accelerator circuit 102 with a private interface between a copy engine and a secure processor, in accordance with at least some embodiments. The accelerator circuit 102 is coupled to the CPU 104 via a peripheral component interconnect (PCI) bus 202. The accelerator circuit 102 can be coupled to one or more PCI components 204 via the PCI bus 202. The CPU 104 executes system software 206, such as operating system (OS), a resource manager (RM), or both in a kernel space. The CPU 104 also executes one or more applications 208 in a user space. The accelerator circuit 102 includes a copy engine (CE) 120, a secure processor 210, and interrupt reporting logic 212. In at least one embodiment, the interrupt reporting logic 212 can be or part of an interrupt controller. The interrupt controller can receive one or more interrupts from the copy engine 120 and send the one or more interrupts to the CPU 104. In some cases, the interrupt controller sends an interrupt controller to the CPU and the CPU has to access registers in the interrupt controller to determine which component issued the interrupt and/or a type of interrupt being raised. The CE 120 includes a cryptographic hardware engine 222 that performs cryptographic operations. The CE 120 treats the system software 206, including the RM, as untrusted (also referred to herein as untrusted software 206). The CE 120 can report security faults using the interrupt reporting logic 212, but also treats the interrupt reporting logic 212 as untrusted. Accordingly, for reporting critical security faults, there is a secure interrupt line 209 to the secure processor 210. The secure processor 210 can be a dedicated on-chip security processor (SEC2). In another embodiment, the secure processor 210 can be a GPU system processor (GSP). The secure processor 210 executes secure software 214 that handle the security faults. The secure software 214 can include a secure RM. The secure interrupt line 209 can be part of a private interface between the copy engine 120 and the secure processor 210. The secure interrupt line 209 is not accessible by other components, such as the CPU 104 or the PCI component 204. The copy engine 120 can detect an error associated with an encryption or decryption operation by the cryptographic hardware engine 222 and can send or issue an interrupt on the secure interrupt line 209. This interrupt is serviced by secure software 214. The secure software 214 can be attested by a user prior to starting confidential computing on the accelerator circuit 102. The copy engine 120 can also send or issue the interrupt on an interrupt line 211 between the interrupt logic 212 and the copy engine 120. The interrupt reporting logic 212 can report the interrupt to the CPU 104 on an interface 213 between the interrupt reporting logic 212 and the CPU 104. As a result of the interrupt, the untrusted software 206 (e.g., untrusted RM) can send or issue a reset (also referred to as an engine reset) to the copy engine 120 via an interface 215 between the copy engine 120 and the CPU 104. The reset-handling logic 122 of the copy engine 120 does not acknowledge the engine reset from the untrusted software 206 until all critical security faults on the context are resolved by secure software 214. This guarantees detection and handling of critical security faults in the CE context during cryptographic operations by secure software 214 before reset. The copy engine 120 thereby provides a reliable tamper detection mechanism for software and also narrows the window of attack, where unauthenticated text maybe exposed or IVs maybe reused.

In at least one embodiment, when the copy engine 120 receives a reset from untrusted software 206, the copy engine 120 goes into a halted state where the copy engine 120 stops issuing new requests and waits for all outstanding binds, flushes, and memory requests to be responding before sending back a reset acknowledgement to the untrusted software 206. The copy engine 120 also waits in this halted state until all secure interrupts are addressed by the secure software 214 before sending back the reset acknowledgement to the untrusted software 206. In this manner, any sensitive data can be protected against an attack. The window of attacked is minimized and the compromised software or tampering can be reported to the user in a guaranteed manner and addressed with high priority.

In at least one embodiment, the copy engine 120 includes one or more registers 224 that are accessible by the CPU 104 (and optionally the PCI component 204) and one or more registers 226 that are not accessibly the CPU 104 or the PCI component 204. In at least one embodiment, the one or more registers 226 include a control register in a PCI configuration space that is accessible by the CPU 104 (or the PCI component 204). In at least one embodiment, the one or more registers 224 can be memory mapped input output (MMIO) registers used by components coupled to the PCI bus 202. In at least one embodiment, the CPU 104 can reset the copy engine 120 by setting a specified bit in the MMIO registers. As described herein, the reset-handling logic 122 can prevent the reset of the copy engine 120 until the security faults are handled by the secure processor 210. The one or more registers 226 are accessible by the secure processor 210 (e.g., SEC2 or GSP). In particular, the copy engine 120 can detect an error associated with a cryptographic operation and can set one or more interrupt status bits in the one or more registers 226. The copy engine 120 (e.g., reset-handling logic 122) can set the one or more interrupt status bits in the one or more registers 226 to report the interrupt(s) to the secure processor 210. In at least one embodiment, the one or more registers 226 can include an interrupt status register. The secure processor 210, in response to one or more interrupts issued by the copy engine 120, can perform one or more operations to protect a context of a cryptographic operation and clear one or more interrupt status bits in the interrupt status register. In at least one embodiment, the secure software 214 can perform the one or more operations to protect the context and clear the one or more interrupt status bits in the interrupt status register of the copy engine 120. Once the one or more interrupt status bits in the interrupt status register are cleared by the secure processor 210, the reset-handling logic 122 can send the reset acknowledgement to the CPU 104 and reset itself. In this manner, the copy engine 120 can guarantee that the one or more interrupts are handled before resetting and sending a reset acknowledgment to the CPU 104.

In at least one embodiment, the secure software 214 can report the one or more interrupts to the application 208 over an encrypted interface 217 between the secure processor 210 and the CPU 104. This can ensure that the application 208 (i.e., the user) is notified of the security faults, even if the interrupts reported by the interrupt reporting logic 212 are masked by untrusted software 206.

In at least one embodiment, the cryptographic hardware engine 222 is an Advanced Encryption Standard Galois Counter Mode (AES-GCM) hardware engine that implements the AES256-GCM cipher. AES-GCM is an authenticated encryption algorithm that performs both encryption and authentication of data streams. Hardware implementations for AES-GCM circuits are expensive due to the 128-bit multipliers required per 16 Bytes needed to be simultaneously encrypted. AES-GCM is a sequential operation that requires data to be sequentially analyzed to compute the GHASH function. A single AES key K is used to both encrypt data and derive authenticated data. The component that GCM uses to produce a message authentication code is called GHASH. If multiple users/applications are attempting to utilize the AES-GCM hardware engine, the operations for one user are serialized and completed before operations for another user are serialized and completed due to state tracking needed for a block counter, an initialization vector (IV), a key (KEY), and GHASH. Because the AES-GCM hardware engine can be shared, there can be opportunities for untrusted software to attempt to gain access or retrieve sensitive data from the context of the AES-GCM hardware engine. As described above, compromised software can cause a security fault and reset the copy engine 120 in an attempt to obtain sensitive data in connection with the AES-GCM operations. The reset-handling logic 122 can prevent the compromised software from resetting the copy engine 120 until the security faults are handled by trusted software, such as secure software 214 of secure processor 210 as described above.

Figure 3:
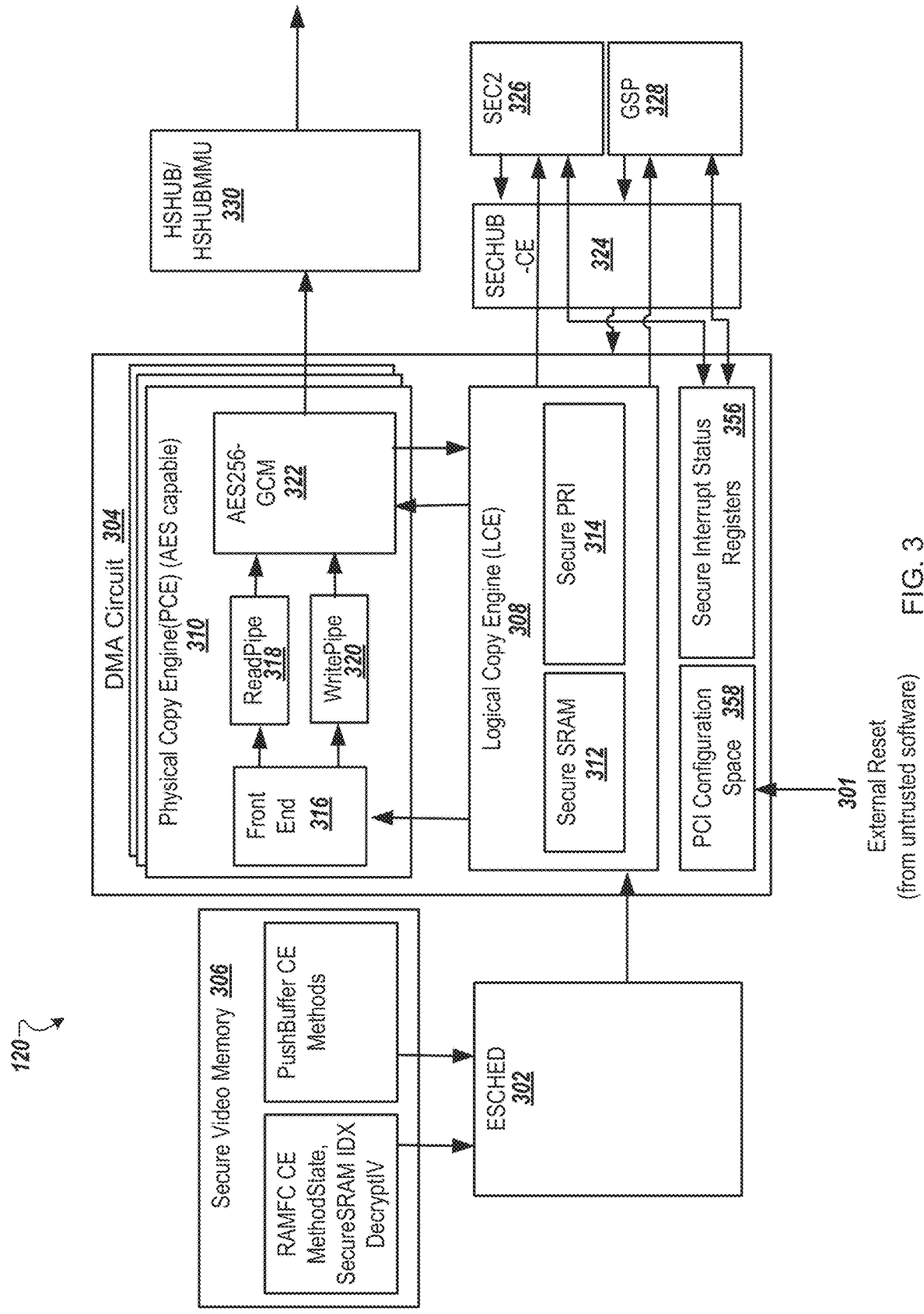
FIG. 3 is a block diagram of a copy engine of an accelerator circuit, in accordance with at least some embodiments.

FIG. 3 is a block diagram of a copy engine 120 of an accelerator circuit, in accordance with at least some embodiments. The copy engine 120 includes a hardware scheduler circuit 302 (labeled ESCHED for engine scheduler) and a direct memory access (DMA) circuit 304. The hardware scheduler circuit 302 is coupled to secondary memory 306 and the DMA circuit 304. The DMA circuit 304 is coupled to a memory management unit 330 (MMU) coupled to system memory (not illustrated in FIG. 3). The MMU 330 can provide routing functionality between system memory and the accelerator circuit. The MMU 330 can provide a path for all engines on the accelerator, including the copy engine 120, to access any location in memory (e.g., video memory, system memory, etc.). The MMU 330 can perform access checks to allow only permitted accesses across the interface. The MMU 330 can restrict and report illegal accesses. The DMA circuit 304 includes a cryptographic circuit that implements an authenticated encryption algorithm to encrypt retrieved data from the secure memory or decrypt received data to be stored in secure memory. In at least one embodiment, as illustrated in FIG. 3, the DMA circuit 304 includes a logical copy engine (LCE) 308 and a physical copy engine (PCE) 310. The DMA circuit 304 can include multiple PCEs that are coupled to the LCE 308. The LCE 308 can include a secure memory 312 that can store an encrypt IV, a block counter, and a HASH key per each channel key slot. Each channel key slot, which can be assigned to an application, can store context for the application in a specified slot in the secure memory 312. The LCE 308 can also include secure private interface 314 that receives configuration information, encrypt and decrypt keys, IV random number generator, secure SRAM programming, from a security hub or other security circuitry that manages private keys. In at least one embodiment, the encrypt and decrypt keys and IV are produced by a random number generator from a security processor on the GPU. In other embodiments, the copy engine 120 can include multiple LCEs as well.

In at least one embodiment, as illustrated in FIG. 3, the PCE 310 includes front-end circuitry 316, a read pipeline 318, a write pipeline 320, and a cryptographic circuit 322 that provides secure data transfers for applications where confidentiality is required. In at least one embodiment, the cryptographic circuit 322 is an AES-GCM hardware engine that implements the AES256-GCM cipher. In at least one embodiment, the cryptographic hardware engine 222 is an AES-GCM circuit. Alternatively, the cryptographic circuit 322 can implement other sequential cryptographic algorithms in which the underlying cryptographic hardware is shared among multiple users (e.g., multiple applications in a time-sliced manner). For example the cryptographic hardware can be shared by multiple users in a cloud infrastructure. For another example, the cryptographic hardware can be used in a virtualized environment in which a hypervisor allows the underlying hardware to support multiple guest virtual machines (VMs) by virtually sharing its resources, including the accelerator circuit 102. In another embodiment, the DMA circuit 304 includes an LCE 308 and a first PCE 310, and a second PCE. The first PCE 310 is coupled to the LCE 308 and includes the cryptographic circuit 322, the first read pipeline 318, and the write pipeline 320. The second PCE is coupled to the LCE 308 and includes a second cryptographic circuit, a second read pipeline, a second write pipeline, and second front-end circuitry. In at least one embodiment, the second cryptographic circuit is a second AES-GCM circuit. Additional PCEs can each include front-end circuitry, a read pipeline, a write pipeline, and a cryptographic circuit.

In at least one embodiment, the copy engine 120 can encrypt data in connection with a data transfer. To encrypt the data transfer, a context is loaded (CTXT LOAD) on LCE 308 with a valid SRAM index that points to a slot in the secure memory 312 assigned to an application. The KEY indicated in the slot in the secure memory 312 is loaded on the cryptographic circuit 322 (AES hardware engine). A first IV that is used is SRAM.IV+1, which is the incremented IV saved in LCE 308. The PCE 310 generates memory requests (reads/writes). The PCE 310 reads data plaintext from a first region of memory (compute protected region (CPR)), and encrypts the data plaintext with the KEY and IV, and adds to the Authentication Tag (AT or AuthTag). During encryption operation, PCE 310 reads from protected memory (e.g., video memory), encrypts the data internally using the cryptographic circuit 322 and writes encrypted data into unprotected region (e.g., system memory or video memory). In at least one embodiment, the PCE 310 writes encrypted data to a second region of memory (non-compute protected region (NonCPR)). At the end of a copy (or a last copy split in a timeslice), the PCE 310 writes IV used to the second region of memory (NonCPR), and writes the computed authentication tag to the second region of memory (NonCPR). The requests can carry a region identifier when interacting with the MMU. The region identifier indicates where the memory region must be CPR or non-compute protected region (NonCPR). The copy engine 120 can interact with the MMU to get the address of each region. The region identifier is specified by the copy engine 120 when making a MMU translation request, since MMU tracks CPR and NonCPR attributes of memory regions. If the region identifier specified by the copy engine 120 does not match the attributes of the target memory location, MMU would prevent the access and return an error (e.g., MMU NACK) to the copy engine 120. The CPR is a first region of memory that contains decrypted data. CPR can be a memory sandbox that is accessible to select clients only and is not accessible to any malicious actors. NonCPR is any region of memory outside of CPR. NonCPR is untrusted as it can be accessed by malicious actors. The copy engine 120 can ensure that data movement from NonCPR to CPR has to follow the decryption path, i.e., nonCPR is required to have encrypted data that only the copy engine 120 with the right key can understand. Likewise, the copy engine 120 can ensure that any data movement from CPR to NonCPR goes through the encryption path. Encrypted data in NonCPR is accessible to malicious actors but cannot be tampered with as the malicious actors do not have the cryptographic keys to understand the encrypted data. The copy engine 120 can write an authentication tag to NonCPR so the use can detect corruption from a malicious actor when it decrypts.

In at least one embodiment, the copy engine 120 can decrypt data in connection with a data transfer. To decrypt the data transfer, a context is loaded (CTX LOAD) on LCE 308 with a valid SRAM index that points to a slot in the secure memory 312 assigned to an application. The KEY indicated in the slot in the secure memory 312 is loaded on the cryptographic circuit 322 (AES hardware engine). A first IV that is used is IB.IV+1, which is the IV that is tracked and incremented in a hardware scheduler circuit and passed to the LCE 308. The PCE 310 reads the expected authentication tag from memory, reads cipher data from the second region of memory (NonCPR), and decrypts the cipher data with KEY and IV, and adds to the authentication tag. During decryption operation, PCE 310 reads from unprotected memory (e.g., system memory or video memory), decrypts the data internally using the cryptographic circuit 322 and writes decrypted data into protected region (e.g., CPR). In at least one embodiment, the PCE 310 writes plaintext data to the first region of memory (CPR). On a last copy split, the PCE 310 reads the authentication tag from the authentication tag address provided in the methods and compares the computed authentication tag with the provided authentication tag. If the values match, the operation is successful. If there is no match, the PCE 310 raises a fatal interrupt, no semaphore release occurs, and channel recovery is needed. Channel recovery (also known as Robust Channel recovery or RC recovery) is a mechanism used by the resource manager, or GPU PF driver, to mark all pending work on an engine as invalid by indicating an error in each of the work channels. The engine is subsequently reset. Channel errors are used by the resource manager (or GPU PF driver) to let a software layer (e.g., CUDA) know the work has not completed.

In at least one embodiment, the W is 96 bits and contrasted from two components, including a 64-bit channel counter with a unique identifier per channel and a 32-bit message counter that starts from zero and is incremented per encrypt/decrypt start of channel (SOC). A 96-bit RNG mask is a per-key mask that is stored in Secure PRI. A copy IV (COPY IV) is a RNG XOR [CHANNEL_CTR, ++MSG_CTR]. The copy engine will detect that an IV has exceeded the maximum number of copies via detecting if the MESSAG_CTR+1 value used in the COPY IV construction is zero. The copy engine 120 keeps track of the encrypt IV used in each encrypt copy and performs pre-increment and save-restore from the SRAM. Encrypt IV is passed to the cryptographic hardware engine 222 post XOR with RNG in the decryptIV methods per copy. The IV that is saved in the SRAM is reflected based on copy completion. The copy engine 120 can have multiple encrypted copies visible to the PCE and maintains two counters, including the IV that should be sent on the net encrypt copy and the last copy completed. On a context save (CTXT_SAVE) the IV from the last copy that was completed is saved to SRAM. The IV for decryption is stored in the instance block and passed to the copy engine 120 during a decrypt copy via decrypt IV methods. The copy engine 120 can detect overflow and interrupt if MESSAGE_CTR=0. The copy engine 120 can XOR the decrypt IV with the correct RNG before passing from LCE to the front-end circuitry 316.

In at least one embodiment, the copy engine 120 includes a secure private interface 314. The secure private interface 314 is accessible by secure software to provide secure configuration or secret keys and query interrupt status for encryption and decryption. The copy engine 120 can connect to a secure hub 324 as a client, allowing a dedicated on-chip security processor (SEC2) 326 and a GPU System Processor (GSP) 328 to access these secure private interface 314, but does not allow BAR0 access. The GSP 328 can be used to offload GPU initialization and management tasks. The SEC2 326 manages encryption keys and other secure information used by the accelerator circuit 102.

In at least one embodiment, the secure memory 312 is a secure SRAM with N entries (e.g., 512 entries), each with a valid bit. Each entry has a lower and upper 128-bit component. The lower component can contain a first encrypt IV counter, a second encrypt IV counter, an IV channel identifier, one or more key indexes, preemption information, and a block counter. The higher component can contain a first partial authentication tag, a second partial authentication tag, a third partial authentication tag, and a fourth partial authentication tag. The secure SRAM can be programmed through the secure private interface 314 via registers. The SRAM can support read, write, and invalidate functionality. The SRAM index can be marked valid when the lower 128 bits of the 256-bit entry are programmed by SEC2 326/GSP 328. An attempt to read an invalid SRAM entry will return 0x0 in the data registers. On a fatal error, the state of the SRAM cannot be guaranteed to be valid. The copy engine 120 can automatically invalidate the SRAM index on a fatal error, so software reprograms the SRAM index.

In at least one embodiment, the DMA circuit 304 includes three kinds of interrupt status registers, including regular interrupt status registers in the PCI configuration space 258 and secure interrupt status registers 356. The PCI configuration space 258 is accessible by the CPU 104 (and other PCI components on the PCI bus 202). In at least one embodiment, the regular interrupt status registers for CPU are in the BAR0 space and accessible to CPU 104. Interrupt line to CPU (via the interrupt controller GIN) is raised if this register belonging to any LCE is non-zero. The secure interrupt status registers 356, however, are not accessible by the CPU 104 or other PCI components on the PCI bus 202. The secure interrupt status registers 356 are accessible by the SEC2 326 and GSP 328. In particular, the secure interrupt status registers 356 can include first secure interrupt status registers for SEC2 326 which are only accessible to SEC2 326 via SECHUB-CE private interface 324. An interrupt line to SEC2 326 is raised if the first secure interrupt status register belonging to any LCE is non-zero. The secure interrupt status registers 356 can include a second secure interrupt status register for GSP 328 which is only accessible to GSP 328 via SECHUB-CE private interface 324. An interrupt line to GSP 328 is raised if the second secure interrupt status register belonging to any LCE is non-zero. The SECHUB-CE private interface 324 just securely routes access from SEC2 326 and GSP 328 to the DMA circuit 304. During operation in at least one embodiment, one or more interrupt lines to the SEC2 326 and GSP 328 are activated if any interrupt status bit the interrupt status register 356 is set. The SEC2 326 (or GSP 328) can read the interrupt status register 356 to determine the fault that caused the interrupt. The SEC2 326 (or GSP 328) can perform one or more operations to remove sensitive data from the context associated with a cryptographic operation being performed by the cryptographic circuit 322. As described herein, the DMA circuit 304 can receive an external reset 301 from untrusted software and can prevent the reset of the DMA circuit 304 until all the interrupt status bits in the interrupt status register 356 are cleared by the SECHUB 324, SEC2 326, and/or GSP 328. Once the interrupt status bits are cleared in the interrupt status register 356, indicating that the faults have been handled by the SEC2 326 (or SECHUB 324 or GSP 328), the DMA circuit 304 can acknowledge the external reset 301 and reset.

Figure 4:
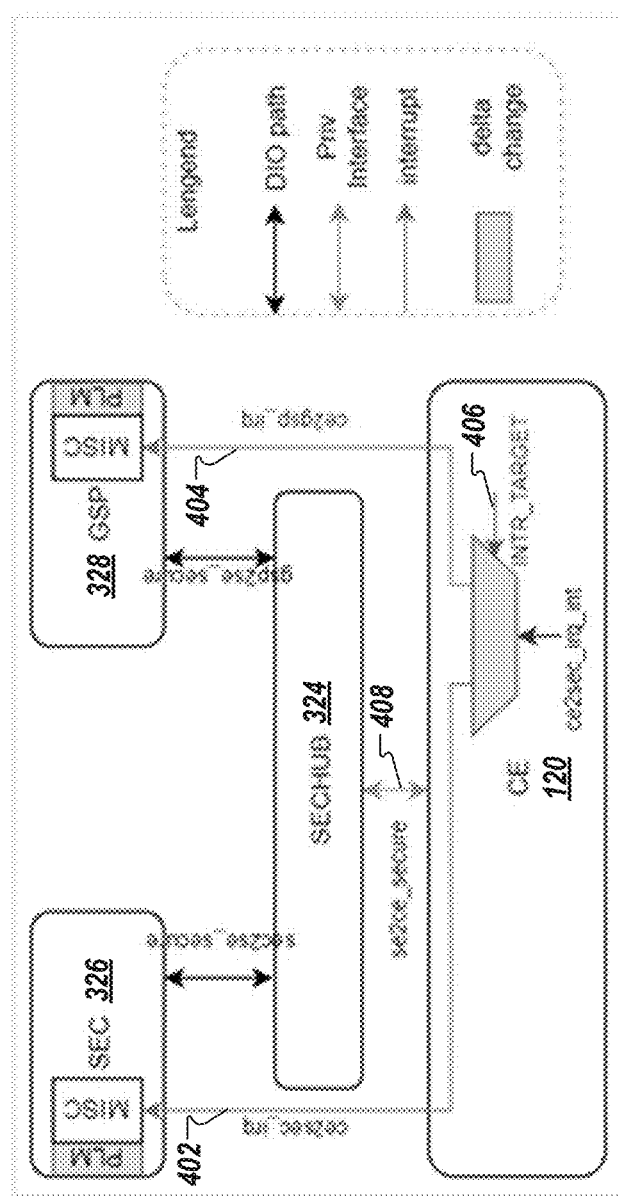
FIG. 4 is a block diagram of interrupt lines between a copy engine and a secure processor and a GPU system processor, in accordance with at least some embodiments.

FIG. 4 is a block diagram of interrupt lines between a copy engine and a secure processor and a GPU system processor, in accordance with at least some embodiments. In at least one embodiment, copy engine 120 includes a first secure interrupt line 402 connected to SEC2 326 (labeled ce2sec_secure_intr) and a second secure interrupt line 404 connected to GSP 328 (labeled ce2gsp_secure_intr). Each of the interrupt status bits can be configured to either apply to the SEC2 326 or GSP 328 via a control signal 406 (INTR_TARGET). In at least one embodiment, all LCEs share the interrupt lines 402, 404. The interrupt line will be activated (e.g., go high) if any one of the interrupt status bits associated with any of the LCEs is set. Software at the SEC 326 or GSP 328 can read through the interrupt status registers to figure out which LCE had the error. As described herein, the SEC2 326 and GSP 328 can access the copy engine 120 via a secure private interface 408 between the SECHUB 324 and the copy engine 120. The secure private interface 408 is connect between SECHUB 324 and the copy engine 120 and cannot be accessed through the PCI configuration space (BAR0). The interrupt status registers are privilege level mask (PLM) protected to only allow SEC2 326 and GSP 328 to clear the interrupt status bits. PLM has a range of numeric values, where a higher number implying higher privilege. Microcodes running on SEC2 326 and GSP 328 (e.g., microcontrollers), respectively, can also have a security level. If a register is PLM protected, it can be accessed by a microcode whose privilege level matches or exceeds the PLM value of that register. There can be a secondary check called, source_id, applying a second filter. The second filter can be used to allow access only to a subset of microcodes that match PLM criteria. As described herein, if any of the interrupt status bits are activated, the LCE will hang, even if a reset bit in the PCI configuration space is programmed, until the interrupt is cleared. In at least one embodiment, the interrupt lines to SEC2 326 and GSP 328 can be used for error reporting. In at least one embodiment, the interrupt lines are stalling, level based and are activated whenever the secure interrupt status register is not zero (i.e., one of the status register bits is set to 1).

In at least one embodiment, the SEC2 326 can be taken as a proxy on the accelerator circuit 102 to set up a secure session between a virtual machine (VM) (e.g., or other application 208) in which the SEC2 326 can perform the key exchange protocol to get a memory encryption key. The copy engine 120 can connect to the SECHUB 324 as a client and the SEC2 326 can program the encryption key into a keyslot through the SECHUB interface. In another embodiment, the GSP 328 can be a centric security processor on the accelerator circuit 102, thus making the GSP 328 the entity responsible for setting up secure sessions.

In at least one embodiment, the copy engine 120 includes two separate interrupt lines to SEC2 326 and GSP 328. For interrupt control, two interrupt status registers (one for SEC2 326 and one for GSP 328) to log any error type, a interrupt enable register to mask each error type on either status register, a interrupt target register for one-time programming of GSP/SEC2 target for each error type, and two interrupt privilege level mask registers (one with only GSP and one with only SEC2 access for source isolation). In this example, SEC2 326 is running trusted microcode and GSP 328 is running code the status of which may be visible to malicious actors (indirectly). The malicious actor for confidential computing could be a system administrator. So, an error is reported to GSP 328, since the attack could have been done on a physical link by a physical probe, which the admin may want to know for datacenter security. However, if the attacker also gets hold of GSP 328, the attacker could suppress the interrupt to the GSP 328. The SEC2 326 secure interrupting solves this problem. Even if GSP 328 sees the error first, it cannot be cleared. This is a mechanism that guarantees tenant (data owner) to be notified of an attack. The tenant can then choose to abandon the work, migrate to a more secure server, or question the system administrator based on service level agreements (SLAs). Furthermore, GSP 328 can handle all interrupts on a GPU. Allocating a separate LCE for each user allows the design to have separate SEC2 SW processes to service the errors, thereby providing error isolation. Thus, one user may attempt to attack another user on the same GPU, but would not know if the attack has been successful. Hiding the result of an attempted attack from the attacker is also some form of security protection.

Figure 5:
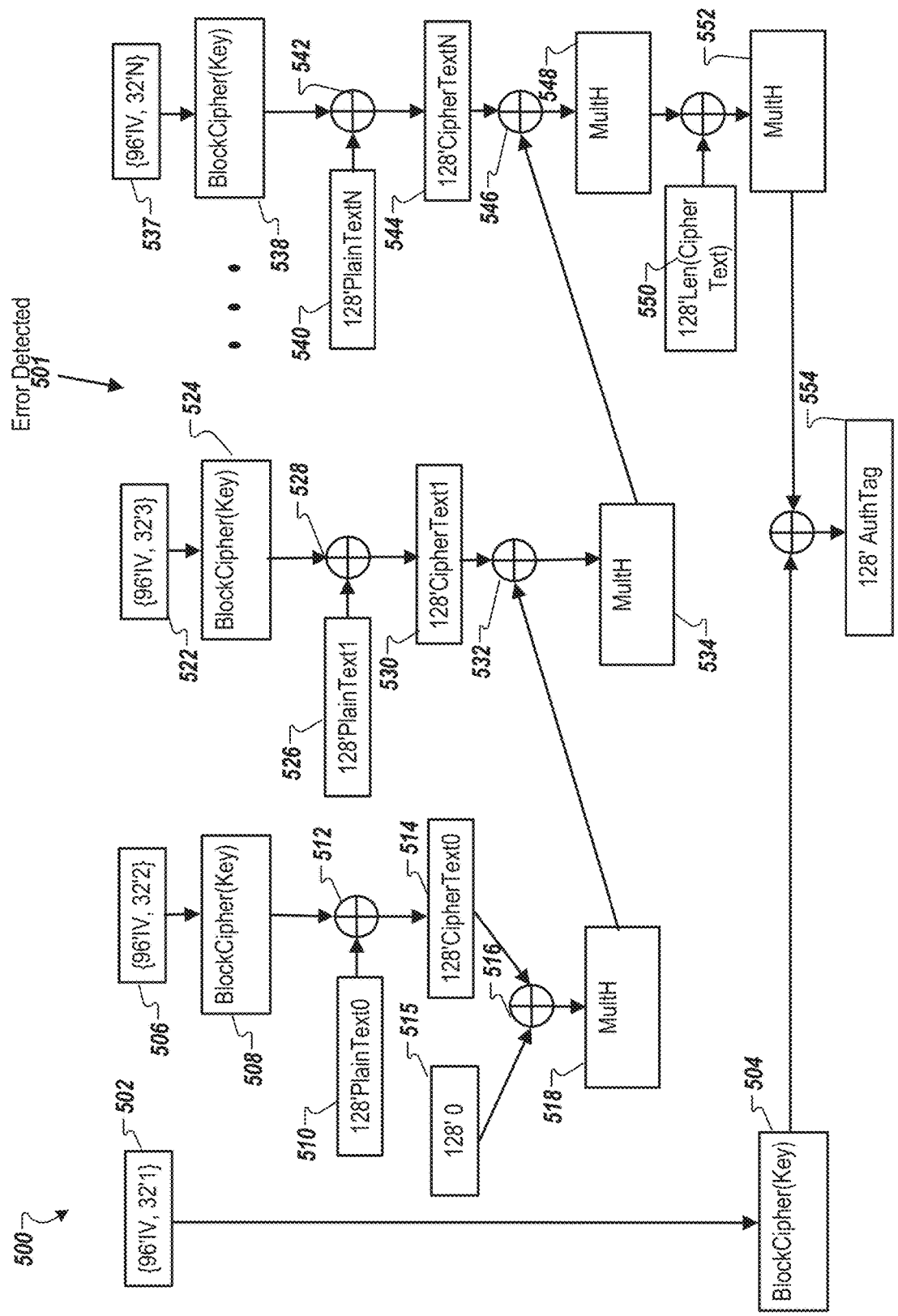
FIG. 5 is a flow diagram of an encryption operation in which an error is detected, in accordance with at least some embodiments.

FIG. 5 is a flow diagram of an encryption operation 500 in which an error is detected, in accordance with at least some embodiments. The encryption operation 500 is a simplified AES-GCM operation that shows an error that occurs before the full data transfer is completed. For AES-GCM, blocks are numbered sequentially using a block counter (32'1). The value of the block counter is combined with a first IV (96'IV) (block 502) and encrypted with an AES block cipher to obtain a first result (block 504). In particular, the first IV and a first value of the first block counter are encrypted with a first block cipher using the first encryption key to obtain the first result. The block counter is incremented (32'2) with the IV (96'IV) (block 506) and encrypted with an AES block cipher to obtain a second result (block 508). In particular, the first IV and a second value of the first block counter are encrypted with a second block cipher using the first encryption key to obtain a second result. The second result and first plaintext 510 are combined (e.g., XOR'd) (block 512) to obtain first ciphertext 514. The first ciphertext 514 is combined with a zero block 515 at block 516 to obtain a first value 518 for the first computed hash key. The first value 518 is a partial authentication tag for the first data transfer.

The block counter is incremented (32'3) with the IV (96'IV) (block 522) and encrypted with an AES block cipher to obtain a third result (block 524). In particular, the first IV and a third value of the first block counter are encrypted with a second block cipher using the first encryption key to obtain a third result. The third result and second plaintext 526 are combined (e.g., XOR'd) (block 528) to obtain second ciphertext 530. The second ciphertext 530 is combined (block 532) with the first value 518 for the first computed hash key stored in secure memory 560 to obtain a second value 534 for the first computed hash key. The second value 534 is a partial authentication tag for the first data transfer.

At the end of the data transfer, the block counter is incremented (32'N) with the IV (96'IV) (block 537) and encrypted with an AES block cipher to obtain a fourth result (block 538). In particular, the first IV and an nth value of the first block counter are encrypted with an Nth block cipher using the first encryption key to obtain the fourth result. The fourth result and Nth plaintext 540 are combined (e.g., XOR'd) (block 542) to obtain Nth ciphertext 544. The Nth ciphertext 544 is combined (block 546) with an Nth value for the first computed hash key stored in secure memory 560 to obtain an Nth value 548 for the first computed hash key. Since this is the last block of the data transfer, the Nth value 548 is combined with a length of the ciphertext to obtain a fifth result 552. The fifth result 552 is combined with the first result from block 504 to obtain a first authentication tag 554.

As illustrated in FIG. 5, an error 501 can be detected during the encryption operation 500. When an error is detected, the partial authentication tag, the plaintext, IVs, or other sensitive data can be exposed to an attacker if a reset occurs before the errors can be handled. Using the embodiments described above, the reset cannot occur until a secure processor can clear one or more interrupt status bits associated with the error 501. That is, the secure processor can make sure that the plaintext is not exposed or that the IVs can be reconfigured or reused by an attacker before resetting.

Figure 6:
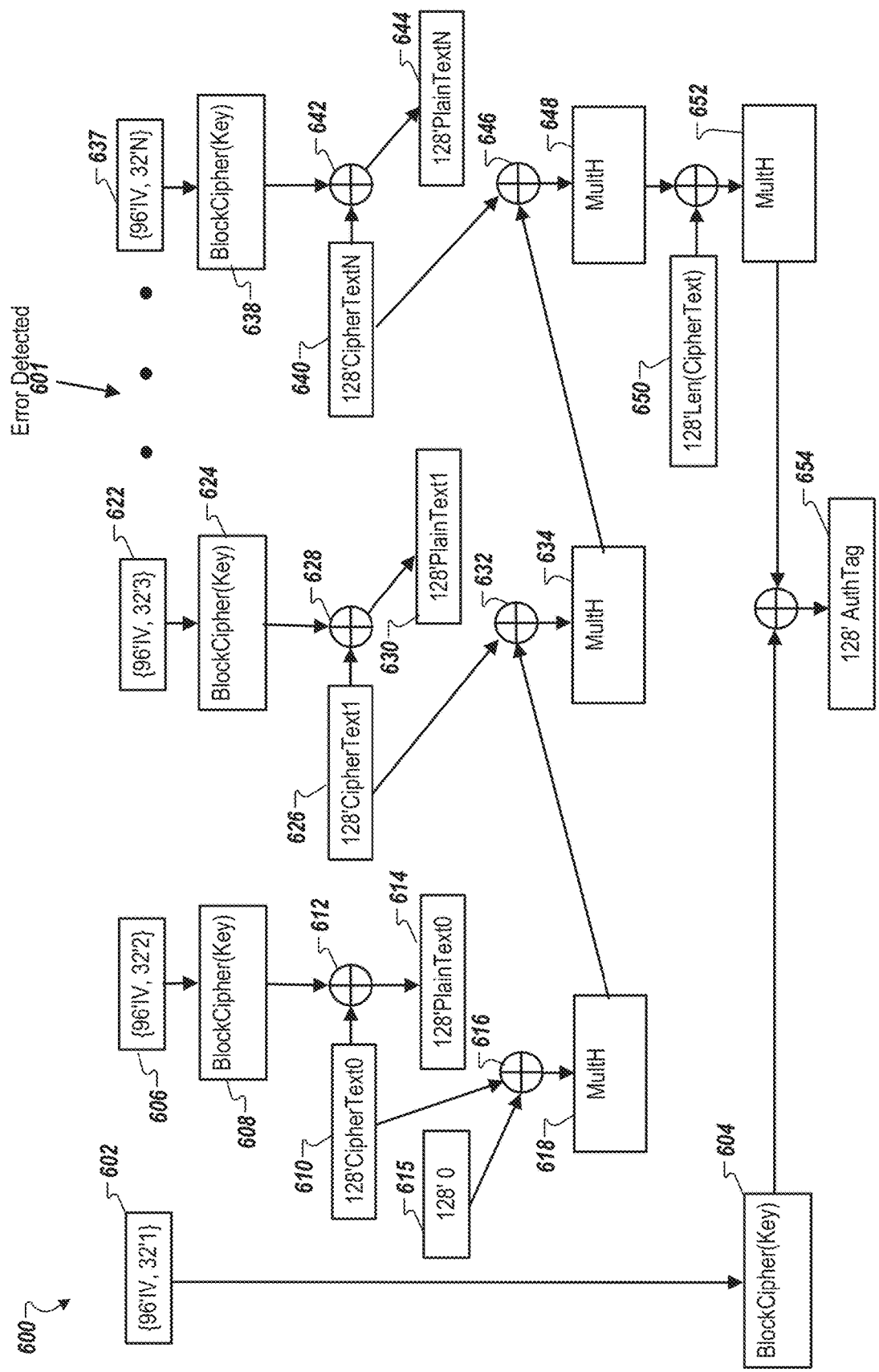
FIG. 6 is a flow diagram of a decryption operation in which an error is detected, in accordance with at least some embodiments.

FIG. 6 is a flow diagram of a decryption operation 600 in which an error is detected, in accordance with at least some embodiments. The decryption operation 600 is a simplified AES-GCM operation that shows a context switch before the full data transfer is completed. For AES-GCM, blocks are numbered sequentially using a block counter (32'1). The value of the block counter is combined with a first IV (96'IV) (block 602) and encrypted with an AES block cipher to obtain a first result (block 604). In particular, the first IV and a first value of the first block counter are encrypted with a first block cipher using the first encryption key to obtain the first result. The block counter is incremented (32'2) with the W (96'IV) (block 606) and encrypted with an AES block cipher to obtain a second result (block 608). In particular, the first IV and a second value of the first block counter are encrypted with a second block cipher using the first encryption key to obtain a second result. The second result and first ciphertext 610 are combined (e.g., XOR'd) (block 612) to obtain first plaintext 614. The first ciphertext 610 and a zero block 615 are combined at block 616 to obtain a first value 618 for the first computed hash key. The first value 618 is a partial authentication tag for the first data transfer.

The block counter is incremented (32'3) with the IV (96'IV) (block 622) and encrypted with an AES block cipher to obtain a third result (block 624). In particular, the first IV and a third value of the first block counter are encrypted with a second block cipher using the first encryption key to obtain a third result. The third result and second ciphertext 626 are combined (e.g., XOR'd) (block 628) to obtain second plaintext 630. The second ciphertext 626 is combined (block 632) with the first value 618 for the first computed hash key, stored in secure memory 660, to obtain a second value 634 for the first computed hash key. The second value 634 is a partial authentication tag for the first data transfer.

At the end of the data transfer, the block counter is incremented (32'N) with the IV (96'IV) (block 637) and encrypted with an AES block cipher to obtain a fourth result (block 638). In particular, the first IV and an nth value of the first block counter are encrypted with an Nth block cipher using the first encryption key to obtain the fourth result. The fourth result and Nth ciphertext 640 are combined (e.g., XOR'd) (block 642) to obtain Nth plaintext 644. The Nth plaintext 644 is combined (block 646) with an Nth value for the first computed hash key stored in secure memory 660 to obtain an Nth value 648 for the first computed hash key. Since this is the last block of the data transfer, the Nth value 648 is combined with a ciphertext length to obtain a fifth result 652. The fifth result 652 is combined with the first result from block 604 to obtain a first authentication tag 654. This authentication tag can be compared against an expected authentication tag. If a match occurs, the operation is successful. If there is no match, then an error is detected as described herein.

As illustrated in FIG. 6, an error 601 can be detected during the decryption operation 600. When an error is detected, the partial authentication tag, the plaintext, IVs, or other sensitive data can be exposed to an attacker if a reset occurs before the errors can be handled. Using the embodiments described above, the reset cannot occur until a secure processor can clear one or more interrupt status bits associated with the error 501. That is, the secure processor can make sure that the plaintext is not exposed or that the IVs can be reconfigured or reused by an attacker before resetting.

Figure 7:
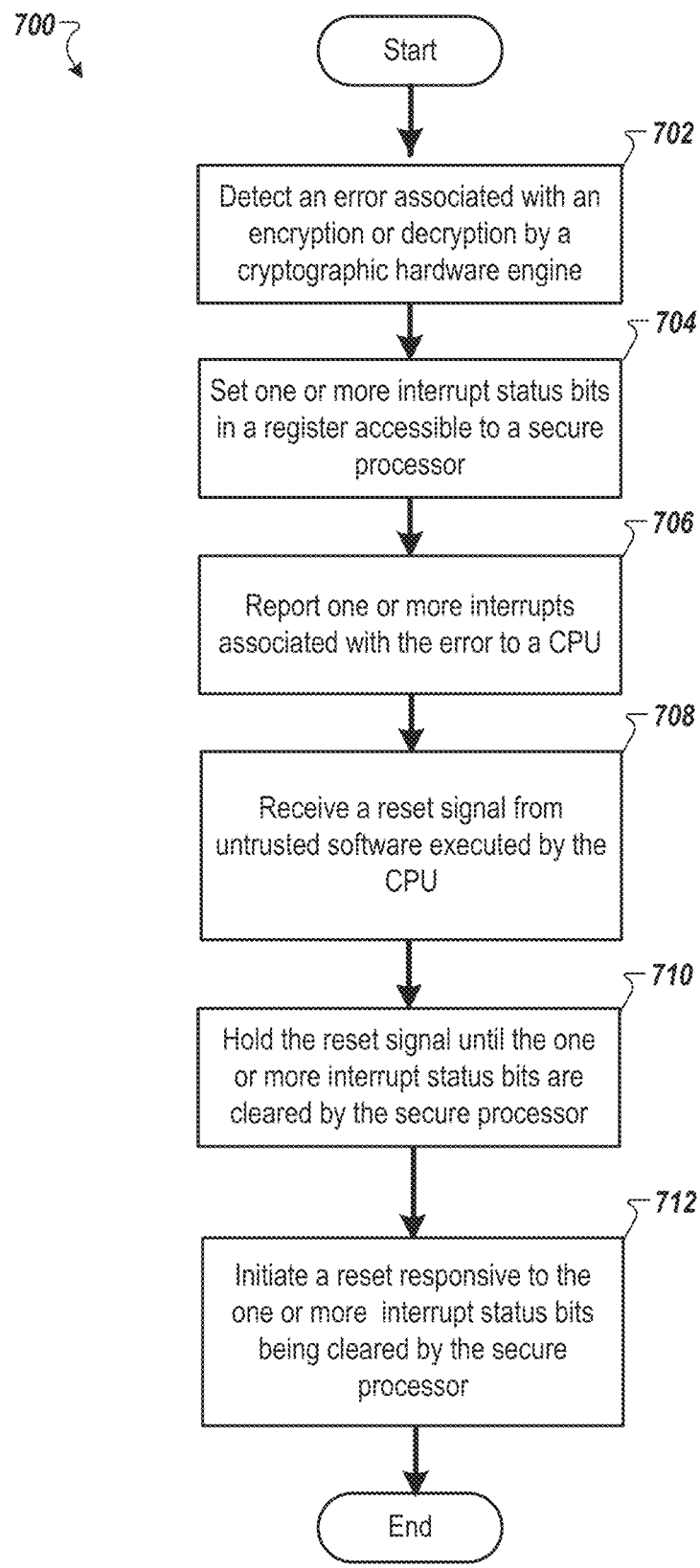
FIG. 7 is a flow diagram of a method of preventing a reset by untrusted software during a cryptographic operation until one or more interrupt status bits are cleared, in accordance with at least some embodiments.

FIG. 7 is a flow diagram of a method 700 of preventing a reset by untrusted software during a cryptographic operation until one or more interrupt status bits are cleared, in accordance with at least some embodiments. Method 700 can be performed by processing logic comprising hardware, software, firmware, or any combination thereof. In at least one embodiment, the method 700 is performed by the accelerator circuit 102 of FIG. 1, 2, or 3. In at least one embodiment, the method 700 is performed by the copy engine 120 of FIG. 1, 2, or 3.

Referring to FIG. 7, the method 700 begins by processing logic detecting an error associated with an encryption or decryption operation by a cryptographic hardware engine of a DMA engine (block 702). The processing logic sets one or more interrupt status bits in a register accessible by a secure processor of the accelerator circuit (block 704). The processing logic reports one or more interrupts associated with the error to a CPU coupled to the accelerator circuit (block 706). The processing logic receives a reset signal from untrusted software executed by the CPU (block 708). The processing logic holds the reset signal until the one or more interrupt status bits are cleared by the secure processor (block 710). The processing logic resets the DMA engine responsive to the one or more interrupt status bits being cleared by the secure processor (block 712), and the method 700 ends.

In a further embodiment, the processing logic performs one or more operations to protect a context associated with the encryption or decryption operation and clears the one or more interrupt status bits in the register responsive to the one or more operations.

In a further embodiment, the processing logic detects a second error associated with a second encryption or decryption operation by the cryptographic hardware engine. The processing logic sets one or more interrupt status bits in a second register accessible by a GSP. The processing logic reports one or more interrupts associated with the second error to the CPU. The processing logic receives a second reset signal from untrusted software executed by the CPU. The processing logic holds the second reset signal until the one or more interrupt status bits in the second register are cleared by the GSP. The processing logic resets the DMA engine responsive to the one or more interrupt status bits being cleared by the GSP.

Figure 8:
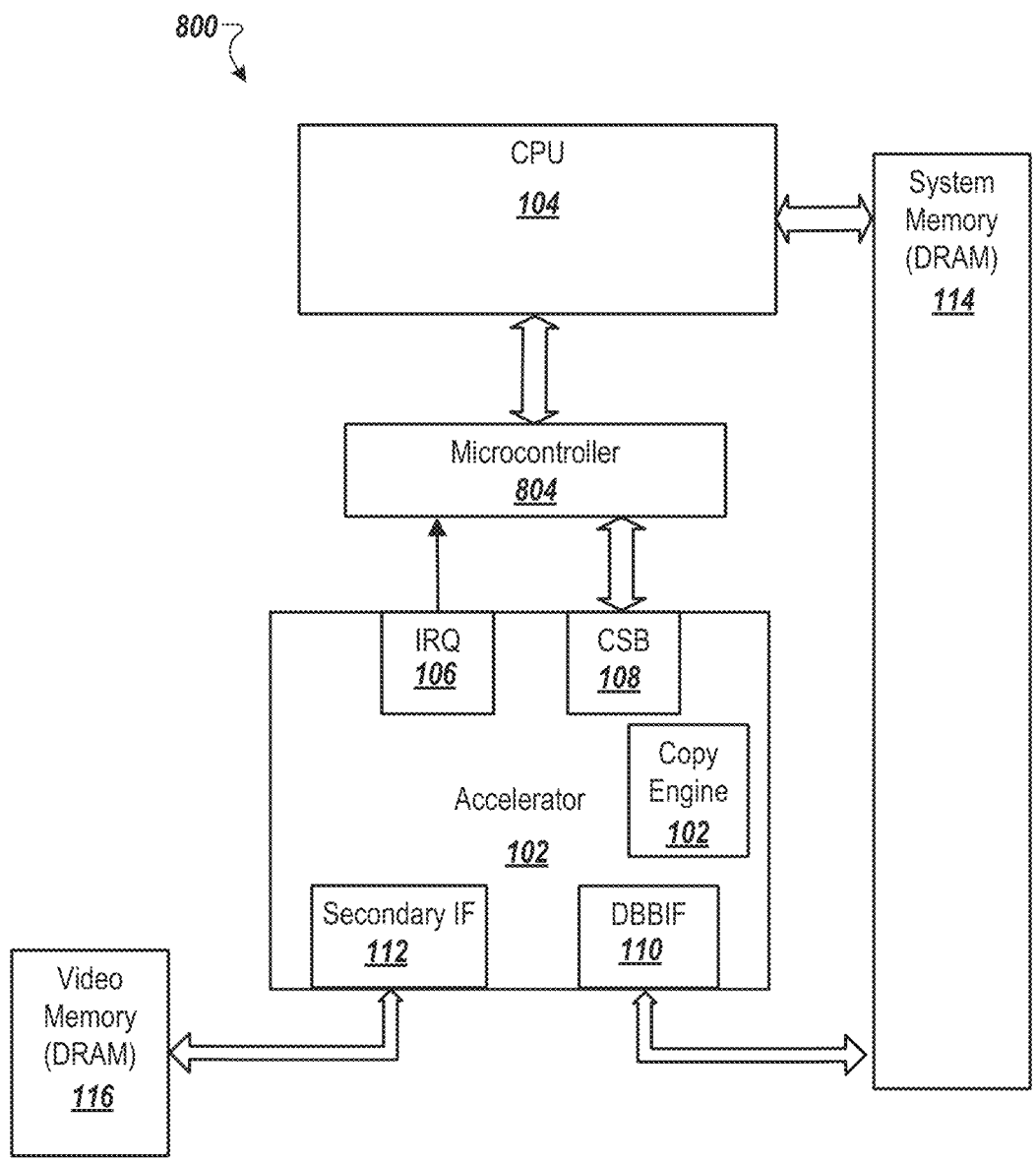
FIG. 8 is a block diagram of a computing system with an accelerator including a copy engine that guarantees fairness among multiple users of the computing system, in accordance with at least some embodiments.

FIG. 8 is a block diagram of a computing system 800 with an accelerator including a copy engine that guarantees fairness among multiple users of the computing system, in accordance with at least some embodiments. The computing system 800 is considered a headed system in which a main system processor, CPU 104 delegates high-interrupt-frequency tasks to a companion microcontroller 804 coupled to the accelerator circuit 102. The computing system 800 is similar to computing system 100 as noted by similar reference numbers, except the computing system 800 includes the companion microcontroller 804. The computing system 800 can be considered a larger system that is characterized by the addition of a dedicated control coprocessor and can include high-bandwidth SRAM to support the accelerator circuit 102.

In some cases, the larger model in FIG. 8 is used when higher performance and versatility are needed. Performance-oriented systems may perform inference on many different network topologies; thus, they maintain a high degree of flexibility. Additionally, these systems may perform many tasks simultaneously, rather than serializing inference operations, so inference operations would not consume too much processing power on the CPU 104. The accelerator circuit 102 can include a memory interface that couples to a dedicated high-bandwidth SRAM to address these needs. The SRAM can be used as a cache by the accelerator circuit 102. The SRAM can also be used by other high-performance computer-vision-related components on the system to further reduce traffic to the main system memory 114 (e.g., DRAM). The accelerator circuit 102 enables the interface with the microcontroller 804 (or a dedicated control coprocessor) to limit the interrupt load on the CPU 104. In at least one embodiment, the microcontroller 804 can be a RISC-V-based PicoRV32 processor, an ARM Cortex-M or Cortex-R processors, or other microcontroller designs. Using a dedicated coprocessor (microcontroller 804), the host processor (CPU 104) can handle some tasks associated with managing the accelerator circuit 102. For example, although the hardware scheduler circuit is responsible for scheduling and fine-grained programming of the accelerator circuit 102, the microcontroller 804 or CPU 104 can still handle some coarse-grained scheduling of the accelerator circuit 102, input-output memory management (IOMMU) mappings of memory access, as needed, memory allocation of input data and fixed weight arrays on accelerator circuit 102, and synchronization between other system components and tasks that run on the accelerator circuit 102.

The techniques disclosed herein may be incorporated in any processor that may be used for processing a neural network, such as, for example, a central processing unit (CPU), a GPU, a deep learning accelerator (DLA) circuit, an intelligence processing unit (IPU), neural processing unit (NPU), tensor processing unit (TPU), a neural network processor (NNP), a data processing unit (DPU), a vision processing unit (VPU), an application-specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, a voice-controlled device, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or alter, generate, or compress an image. For example, such a processor may be employed to enhance an image rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile devices, etc.) to enhance services that stream images such as NVIDIA GeForce Now (GFN), Google Stadia, and the like.

As an example, a processor incorporating the techniques disclosed herein can be employed to process one or more neural networks for any other types of applications that can take advantage of a neural network. For example, such applications may involve translating languages, identifying and negating sounds in audio, detecting anomalies or defects during the production of goods and services, surveillance of living beings and non-living things, medical diagnosis, making decisions, and the like.

Other variations are within the spirit of the present disclosure. Thus, while disclosed techniques are susceptible to various modifications and alternative constructions, certain illustrated embodiments are shown in drawings and described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if something is intervening. Recitation of ranges of values herein is merely intended to serve as a shorthand method of referring individually to each separate value falling within the range unless otherwise indicated herein. Each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when indicated explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors—for example, a non-transitory computer-readable storage medium stores instructions and a main central processing unit ("CPU") executes some of the instructions while a graphics processing unit ("GPU") and/or a data processing unit ("DPU")—potentially in conjunction with a GPU—executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or a similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an interprocess communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An accelerator circuit comprising:
 a direct memory access (DMA) engine coupled to a central processing unit (CPU), the DMA engine comprising a cryptographic hardware engine; and
 a secure processor coupled to the DMA engine via a private interface and the CPU via an encrypted interface, wherein the DMA engine is to:
  detect an error associated with an encryption or decryption operation by the cryptographic hardware engine;
  set one or more interrupt status bits in a first register accessible by the secure processor;
  report one or more interrupts associated with the error to the CPU and the secure processor;
  receive a reset signal from untrusted software executed by the CPU;
  hold the reset signal until the one or more interrupt status bits are cleared by the secure processor; and
  initiate a reset responsive to the one or more interrupt status bits being cleared by the secure processor.

2. The accelerator circuit of claim 1, further comprising an interrupt controller coupled to the DMA engine and the CPU, wherein the interrupt controller is to receive the one or more interrupts from the DMA engine and send the one or more interrupts to the CPU.

3. The accelerator circuit of claim 1, wherein the secure processor is to:
 perform one or more operations to protect a context associated with the encryption or decryption operation; and
 clear the one or more interrupt status bits in the first register responsive to the one or more operations.

4. The accelerator circuit of claim 3, wherein the secure processor is further to execute trusted software, wherein the trusted software is to send the one or more interrupts to the untrusted software.

5. The accelerator circuit of claim 1, wherein the cryptographic hardware engine is an Advanced Encryption Standard Galois Counter Mode (AES-GCM) hardware engine.

6. The accelerator circuit of claim 1, wherein the DMA engine comprises:
 the first register accessible by the secure processor, wherein the first register is not accessible by the CPU; and
 a second register accessible by the CPU, wherein the second register is a memory mapped input output (MMIO).

7. The accelerator circuit of claim 1, wherein the accelerator circuit is a graphics processing unit (GPU), a deep learning accelerator (DLA) circuit, an intelligence processing unit (IPU), a neural processing unit (NPU), a tensor processing unit (TPU), a neural network processor (NNP), a data processing unit (DPU), a vision processing unit (VPU), an application-specific integrated circuit (ASIC), or a field-programmable gate array (FPGA).

8. The accelerator circuit of claim 1, wherein the accelerator circuit is a graphics processing unit (GPU), wherein the DMA engine comprises a second register accessible by the CPU, wherein the untrusted software is a first resource manager, wherein the DMA engine is to receive the reset signal by the first resource manager setting a bit in the second register, wherein a second resource manager executed by the secure processor is to clear the one or more interrupt status bits in the first register.

9. The accelerator circuit of claim 1, wherein the accelerator circuit comprises a control register in a peripheral component interconnect (PCI) configuration space that is accessible by the CPU, wherein the first register is not accessible by the CPU.

10. The accelerator circuit of claim 1, wherein the DMA engine comprises:
 a first interrupt line that is activated if any interrupt status bit in the first register is set;
 a first logical compute engine (LCE);
 a first physical compute engine (PCE) coupled to the first LCE and comprising the cryptographic hardware engine;
 a second PCE coupled to the first LCE and comprising a second cryptographic hardware engine; and
 a second LCE, wherein a second resource manager executed by the secure processor is to read the first register to determine which of the first LCE or the second LCE had the error.

11. The accelerator circuit of claim 1, wherein the accelerator circuit is a graphics processing unit (GPU), wherein the GPU comprises the DMA engine, the secure processor, and a GPU system processor (GSP), wherein the GSP is coupled to the DMA engine via the private interface, wherein the DMA engine is further to:
 detect a second error associated with a second encryption or decryption operation by the cryptographic hardware engine;
 set one or more interrupt status bits in a second register accessible by the GSP;
 report one or more interrupts associated with the second error to the CPU;
 receive a second reset signal from untrusted software executed by the CPU;

hold the second reset signal until the one or more interrupt status bits in the second register are cleared by the GSP; and initiate a reset responsive to the one or more interrupt status bits being cleared by the GSP.

12. The accelerator circuit of claim 11, further comprising a secure hub coupled to the DMA engine, the secure processor, and the GSP.

13. A method comprising:
detecting, by an accelerator circuit, an error associated with an encryption or decryption operation by a cryptographic hardware engine of a direct memory access (DMA) engine of the accelerator circuit;
setting one or more interrupt status bits in a register accessible by a secure processor of the accelerator circuit;
reporting one or more interrupts associated with the error to a central processing unit (CPU) coupled to the accelerator circuit;
receiving a reset signal from untrusted software executed by the CPU;
holding the reset signal until the one or more interrupt status bits are cleared by the secure processor; and
initiating a reset responsive to the one or more interrupt status bits being cleared by the secure processor.

14. The method of claim 13, further comprising:
performing one or more operations to protect a context associated with the encryption or decryption operation; and
clearing the one or more interrupt status bits in the register responsive to the one or more operations.

15. The method of claim 13, further comprising:
detecting a second error associated with a second encryption or decryption operation by the cryptographic hardware engine;
setting one or more interrupt status bits in a second register accessible by a GPU system processor (GSP);
reporting one or more interrupts associated with the second error to the CPU;
receiving a second reset signal from untrusted software executed by the CPU;
holding the second reset signal until the one or more interrupt status bits in the second register are cleared by the GSP; and
initiating a reset responsive to the one or more interrupt status bits being cleared by the GSP.

16. A system comprising:
a central processing unit (CPU); and
a graphics processing unit (GPU) coupled to the CPU, wherein the GPU comprises:
a direct memory access (DMA) circuit comprising an Advanced Encryption Standard Galois Counter Mode (AES-GCM) hardware engine; and
a processor coupled to the DMA circuit via a private interface and the CPU via an encrypted interface, wherein the DMA circuit is to:
detect an error associated with an encryption or decryption operation by the AES-GCM hardware engine;
set one or more interrupt status bits in a first register accessible by the processor;
report one or more interrupts associated with the error to the CPU;
receive a reset signal from untrusted software executed by the CPU;
hold the reset signal until the one or more interrupt status bits are cleared by the processor; and
initiate a reset responsive to the one or more interrupt status bits being cleared by the processor.

17. The system of claim 16, wherein the processor is at least one of a secure processor or a GPU system processor.

18. The system of claim 16, wherein the processor is to:
perform one or more operations to protect a context associated with the encryption or decryption operation; and
clear the one or more interrupt status bits in the first register responsive to the one or more operations.

19. The system of claim 16, wherein the DMA circuit comprises:
the first register accessible by the processor, wherein the first register is not accessible by the CPU; and
a second register accessible by the CPU, wherein the second register is a memory mapped input output (MMIO), wherein the untrusted software is a first resource manager to send the reset signal by setting a bit in the second register being programmed, wherein a second resource manager executed by the processor is to clear the one or more interrupt status bits.

20. The system of claim 16, wherein the DMA circuit comprises a second register accessible by the CPU, wherein the untrusted software is a first resource manager, wherein the first resource manager is to send the reset signal by a bit in the second register being programmed, and wherein a second resource manager executed by the processor is to clear the one or more interrupt status bits.

* * * * *